United States Patent [19]

Sears et al.

[11] Patent Number: 5,321,635
[45] Date of Patent: Jun. 14, 1994

[54] SYNCHRO DRIVE STABILIZATION SYSTEM

[75] Inventors: Jerome Sears, Wyckoff; Walter Parfomak, Wallington; Arieh J. Neuwirth, Fair Lawn; Walter Kluss, Kearny, all of N.J.

[73] Assignee: AlliedSignal Inc., Morris Township, Morris County, N.J.

[21] Appl. No.: 939,280

[22] Filed: Sep. 2, 1992

[51] Int. Cl.[5] .................... G06F 15/20; G05B 23/02
[52] U.S. Cl. ............................. 364/483; 364/480; 364/579; 361/18
[58] Field of Search ............ 364/480, 481, 483; 318/434; 361/44, 18, 20, 23, 24, 30, 31, 58

[56] References Cited

U.S. PATENT DOCUMENTS

| | | | |
|---|---|---|---|
| 3,963,963 | 6/1976 | Schade, Jr. | 361/44 |
| 3,970,897 | 7/1976 | Tamir et al. | 361/23 |
| 4,218,647 | 8/1980 | Haas | 361/18 |
| 4,290,000 | 9/1981 | Sun | 318/434 |
| 4,428,016 | 1/1984 | Brasfield | 361/18 |
| 4,518,905 | 5/1985 | Rhodes, Jr. | 361/23 |
| 4,785,405 | 11/1988 | Hasegawa et al. | 364/480 |
| 4,953,054 | 8/1990 | Fetzer et al. | 361/45 |
| 4,961,033 | 10/1990 | Hirota | 318/434 |
| 4,977,530 | 12/1990 | Cline et al. | 364/483 |
| 5,136,459 | 8/1992 | Fararooy | 364/483 |

Primary Examiner—Thomas G. Black
Assistant Examiner—Tan Q. Nguyen
Attorney, Agent, or Firm—Howard G. Massung

[57] ABSTRACT

A system (10) for controlling stabilization of a synchro (26), which is driven from a digital to synchro converter (12), which utilizes a current sensor (14) to detect the magnitude of the synchro current drive signal and through a compare and hold circuit (20) compares the magnitude of the current with a predetermined maximum current and if exceeded provides a signal to a logic control (22) which controls a current limiter (16), disposed in series with the conductors providing load current to synchro (26). Current limiter (16) operates in a non-current limiting mode, wherein load current is passed unhindered to synchro (26), and a current limiting mode wherein current limiting resistors are inserted in series with the conductors carrying drive current to synchro (26). When the commanded drive current exceeds the reference current, compare and hold circuit (20) initiates a signal to cause current limiter (16) to operate in the current limiting mode. Compare and hold circuit (20) also includes a delay circuit which keeps current limiter (16) in the current limiting mode for a short period of time after the commanded drive current falls below the reference current level. A pulse width oscillator (24) provides an input to logic control (22) which causes logic control (22) to periodically switch current limiter (16) to the unlimited current condition for short periods of time even when the compare and hold circuit (20) is providing a signal requesting the current limiting mode.

6 Claims, 3 Drawing Sheets

SYNCHRO DRIVE STABILIZATION SYSTEM

BACKGROUND OF THE INVENTION

1. Field of the Invention

The present invention relates to synchro drive systems including the type which are used in cockpit display devices.

2. Description of the Prior Art

It is known in the art that direct synchro load receivers ("synchronous drive") may exhibit uncontrolled spin, instability or other undesirable oscillatory behavior when subjected to large angle commands from an electronic digital to synchro converter ("D/S converter").

The primary reason for such instability in the synchro drive is a consequence of the saturation characteristics of the D/S converter, which typically has a saturation threshold which is equal to about 15° of angular input. Such instability is unacceptable since a steady state value is never achieved.

One approach to reduce the occurrence of instability of the synchro is to decrease the power available to drive the synchro; this however results in a slower rate of response and reduced accuracy of the display device as the reduced drive power will be insufficient to allow for a rapid response to be displayed or indicated by the synchro as a function of the input signal also known as the digital angle command signal. Further, there is a loss of resolution in the output display of the synchro as the reduced power available reduces the accuracy of the indication.

An alternate method to reduce the occurrences of uncontrolled spin, instability, or other undesirable oscillation is to introduce a mechanical and/or fluid damping system into the synchro. Such a system would include the moving mechanical elements of the synchro drive and due to the viscous effects of the fluid, limits the rate of response of the synchro drive. Such a system is also undesirable as it is complex to fabricate, and further, causes a lag in the response of the synchro drive.

Accordingly, there is a continuing need in the art for improved direct synchro drive stabilization systems.

SUMMARY OF THE INVENTION

The present invention provides a method and an apparatus for effecting stabilization of a synchro drive system. According to the present invention, in a synchro drive system, the magnitude of the angle command, "$\phi$" is evaluated, and if it is determined to be above a predetermined threshold angle value, then current limiting resistors are switched in series with the synchro load. As the introduction of such current limiting resistors also decreases the power to drive the synchro load, concurrently there is also supplied intermittent high power pulses. In this manner, the maximum power is applied in an intermitted manner causing the proper response from the synchro drive while completely eliminating the undesirable spin, instability or oscillatory behavior, while simultaneously preserving the accuracy of the resolution in the synchro output. Such a mode of operation is maintained until the magnitude of the angle command $\phi$ decreases below the predetermined threshold angle value, at which point the current limiting resistors are removed from the series connection with the synchro load. Removing the current limiting resistors allows the full drive current in response to the angle command $\phi$ to pass through unhindered to the synchro drive system, which is permitted to respond in an unhindered manner.

BRIEF DESCRIPTION OF THE DRAWINGS

For a better understanding of the invention reference may be had to the preferred embodiment exemplary of the invention shown in the accompanying drawings in which.

DETAILED DESCRIPTION OF THE PREFERRED EMBODIMENTS

Figure 1:
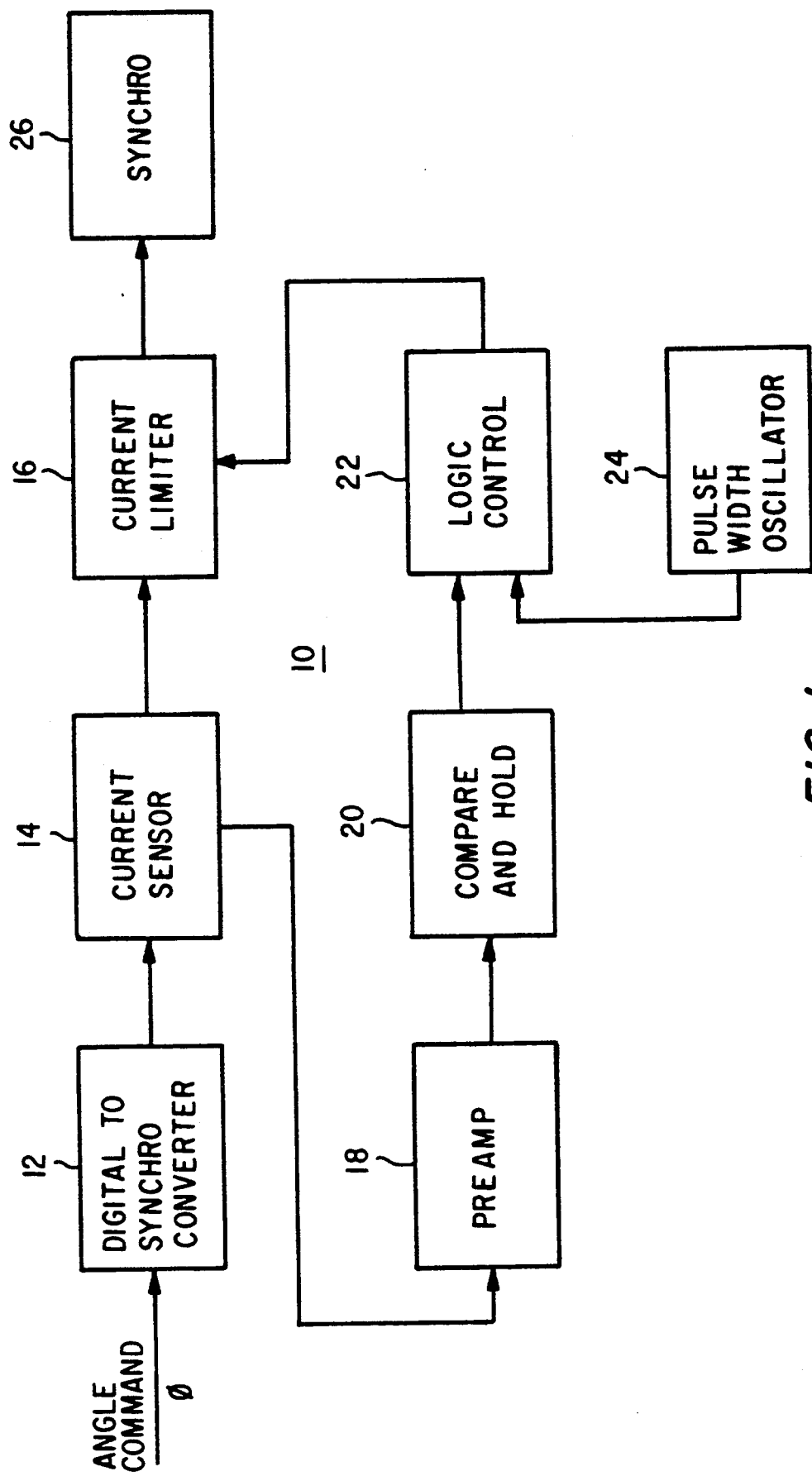
FIG. 1 is a block diagram of a drive system according to the present invention for controlling stability of a synchro.

Referring now to the drawings and FIG. 1 in particular there is shown a block diagram of a synchro current limiting control circuit 10 constructed according to the teaching of the present invention. An angle command $\phi$, which represents a desired or commanded position of the output display of synchro 26 is fed to a digital to synchro converter 12. Digital to synchro converter 12, in response to the angle command $\phi$, provides output drive current signals which are fed to the stator windings of synchro 26 for controlling the position of the synchro rotor and its connected display. A current sensor 14 is disposed to sense the magnitude of the output drive current from digital to synchro converter 12. Current sensor 14 provides an output signal whose magnitude is a function of the drive current magnitude to synchro 26. The current sensed signal from current sensor 14 is fed to a preamplifier 18 and then to a compare and hold circuit 20. In the compare and hold circuit 20 the current sensed signal, which is a function of the angle command $\phi$, is compared with a reference signal and if the selected reference signal is exceeded, the compare and hold circuit 20 provides an output to a logic control 22 which controls a current limiter 16 to limit the magnitude of the drive current fed to synchro 26.

The control signal from compare and hold circuit 20 once initiated is held for a predetermined period of time after the current sensed signal falls below the reference signal. Holding the control signal for a short period of time provides for more stable operation of control circuit 10. Current limiter 16 is constructed to operate at a high current level wherein the AC drive current from digital to synchro converter 12 passes unrestricted to synchro 26 and a low current level wherein the AC output from digital to synchro converter 12 passes through current limiting resistors. Logic control 22 controls when current limiter 16 is to be in the current limiting mode or non-current limiting mode of operation, with current limiting resistors inserted in series in the synchro drive current conductors. A pulse width oscillator 24 provides a signal to logic control 22 for periodically causing logic control 22 to cause current limiter to bypass the current limiting resistors and feed full drive current direct to the synchro stator windings. Thus, even while the compare and hold circuit 20 is providing a signal to logic control 22 to cause current limiter 16 to be in the current limiting mode, the pulse width oscillator provides an overriding signal to periodically allow high current pulses to pass unhindered to the synchro. These high current pulses are only maintained for a relatively short time and do not cause instability or spin of synchro 26. When compare and hold circuit 20 does not command a current limiting mode, current limiter 16 is in the non-current limiting mode and pulse width oscillator has no effect on the drive current supplied to synchro 26.

Figure 2:
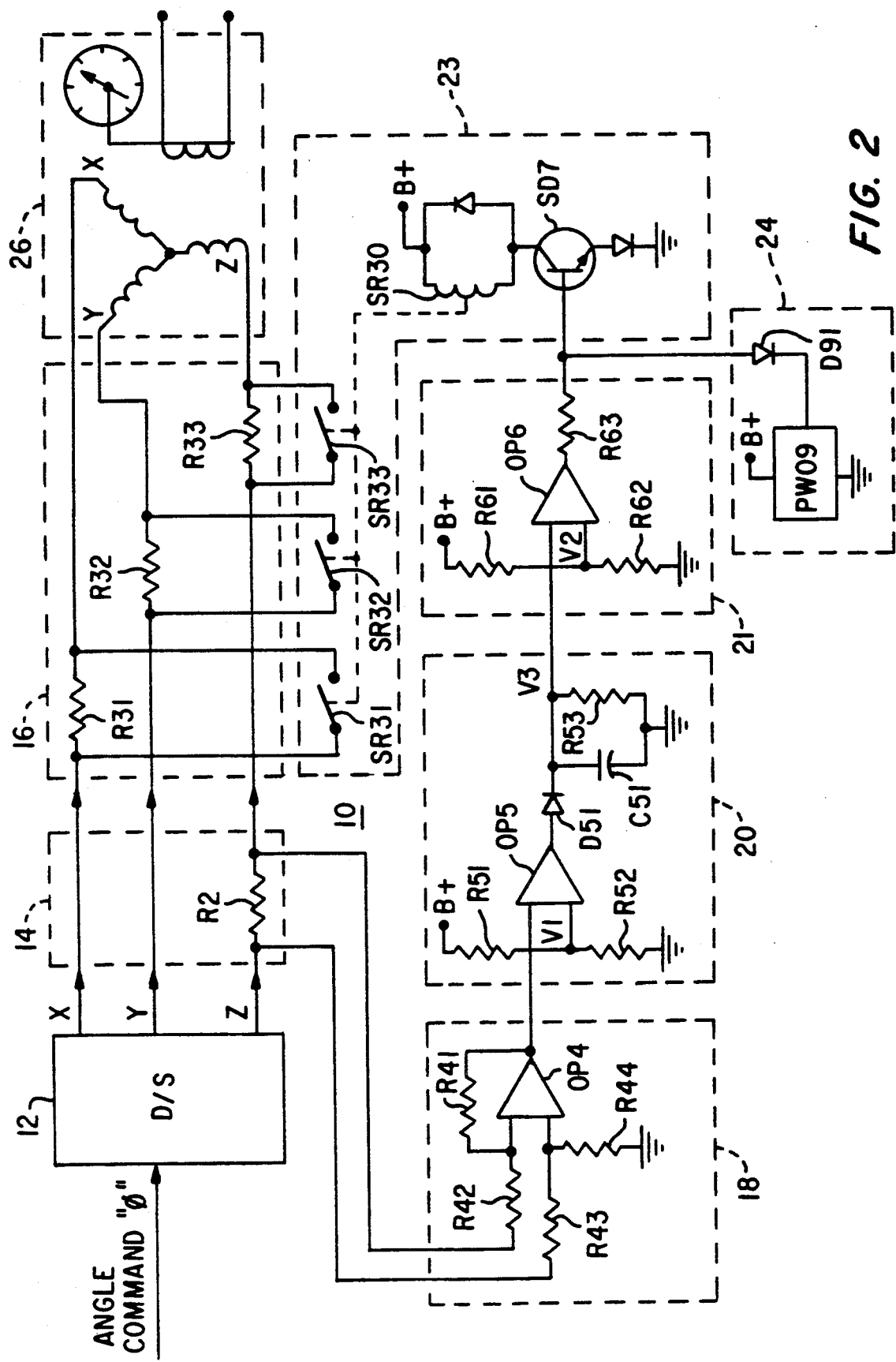
FIG. 2 is a schematic of a synchro drive stabilization system according to a preferred embodiment of the invention; and, FIG. 3 is a diagram showing output voltage waveforms of the pulse width controller of FIG. 1 and a picture window of when the related AC high and low drive current is applied to the synchro.

With reference now to FIG. 2, there is illustrated a functional schematic of a synchro drive stabilization system 10 according to a preferred embodiment of the invention. Stabilization system 10 includes a digital to synchro converter or D/S converter 12, a command current magnitude sensor 14, a load current limiter 16, a signal conditioner and preamplifier 18, a compare and hold circuit 20, a logic or select control circuit 21, a switch control circuit 23, a synchro load and display 26, and a pulse width oscillator 24.

During a normal mode of operation, an angle command $\phi$ is received by the D/S converter 12 which may be a conventional device as known in the art. The D/S converter 12 receives as input a digital signal representative of an angle command, $\phi$, and provides three output drive signals which are fed to the synchro stator windings to cause the AC excited rotor to move to a position corresponding to angle command $\phi$. The three AC signals are of approximately the magnitude which is determined by the angle command $\phi$. The torque developed to position the rotor of synchro 26 is a function of its displacement from the command position. In the instant embodiment three synchro drive signals are necessary as the synchro has three stator windings; other synchro drives which have different stator winding configurations may also be used.

The three output drive signals from the D/S converter 12, represented by "X", "Y", and "Z" next pass to a current sensor 14 which includes a current sensing resistor R2 located in series with the output signal of one of the three output signals, Z. Current sensing resistor R2 is preferably a conventional resistor having a low resistance value which decreases the magnitude of the output drive signal Z by a small amount so as not to detract from the performance of the synchro drive system 10. The voltage drop across the current sensing resistor R2 is used as an input to the signal conditioning and preamplifier 18, which thru the compare and hold circuit 20, the select circuit 21, and the switch control 23 controls current limiter 16 to limit the magnitude of the output current signals X, Y, and Z. The load current limiter 16 includes power limiting resistors R31, R32, R33 which are switched in series with the output signals X, Y and Z, if the magnitude of the angle command $\phi$ is greater than the determined threshold angle value $\theta$. The magnitude of the threshold angle $\theta$ is established less than the minimum magnitude of the angle command $\phi$ which could cause unstable or undesirable operation of the servo 26.

The voltage drop across the current sensing resistor R2 is provided to the signal conditioning and preamplifier 18 which amplifies the voltage drop signal, which is a function of the magnitude of the current thru resistor R2, and provides an output to the compare and hold circuit 20 which is used to evaluate the magnitude of the voltage drop across the current sensing resistor R2. The p amplifier 18 may be a conventional preamplifier circuit of the differential type used for current sensing operations, and includes an operational amplifier, OP4, and a plurality of resistors, R41, R42, R43 and R44 whose values may be selected so to provide a desired voltage gain. In the present embodiment wherein the input voltage supply represented in the FIG. 2 as B+ has a value of 15 volts, the resistors R41, R42, R43 and R44 are selected to provide a voltage gain of ten.

The output of preamplifier 18 is then provided to the compare and hold circuit 20 which ultimately evaluates the magnitude of the angle command $\phi$ by comparing the output signal from preamplifier 18 with a set reference voltage. The compare and hold circuit 20 may be a circuit substantially as shown on FIG. 2 and includes an operational amplifier, OP5, conventional resistors R51, R52 which function as voltage dividers, a diode D51, and further, a parallel arrangement of a capacitor C51 and a resistor R53 connected as shown between the output and ground. Also provided is an input voltage reference source B+ which is 15 volts. The voltage source B+ supplies the voltage divider formed by resistors R51, R52 which supplies a reference input to amplifier OP5. A hold circuit consisting of parallel capacitor C51 and resistor R53 function to maintain the voltage at the output of circuit 20 when the output voltage level from amplifier OP5 drops.

In operation of circuit 20, the resistors R51 and R52 function as a voltage dividers so to provide an input voltage to the operational amplifier OP5 of a magnitude of V1 which is representative of the selected threshold angle value $\theta$ of the synchro system 10. Voltage V1 is scaled in proportion to the range of outputs of the preamplifier 18 which correspond to the range of input commands $\phi$. More clearly, the magnitude of V1 is established such that it corresponds to an output of the preamplifier 18 which represents the condition when the angle command $\phi$ equals or exceeds the selected threshold angle $\theta$ of the synchro drive system 10.

The output of the compare and hold circuit 20 passes to the select circuit 21 as shown. Select circuit 21 includes an operational amplifier OP6, resistors R61, R62 in a series voltage dividing arrangement and a further output resistor R63. The resistors R61 and R62 function as a voltage divider to provide an input to the operational amplifier OP6 of a magnitude of V2 which is representative of the threshold angle value $\theta$ of the system, but is preferably less, for reasons which shall be elucidated below.

The output of the select circuit 21 passes to a switching control circuit 23 which may be a circuit substantially as shown, or its equivalent. As shown on FIG. 2, the switching control circuit 23 includes a switch driver SD7, and a relay SR30 having switch contacts SR31, SR32, SR33 for providing a shunt across power limiting resistors R31, R32 and R33 described above. The switch driver SD7 and relay SR30 are responsive to the output of the select circuit 21.

During operation, if it is determined by the compare and hold circuit 20 that the voltage drop across the current sensing resistor R2 as amplified by the preamplifier 18 has a magnitude representative of the condition wherein the magnitude of the angle command $\phi$ is equal to or greater than the determined threshold angle $\theta$ then amplifier OP5 outputs a signal having a magnitude greater than V2 to OP6 which in turn activates the switching circuit 23 opening switch contacts SR31, SR32 and SR33 causing the power limiting resistors R31, R32 and R33 to be introduced in series with the drive current signals X,Y, and Z which feed the synchro 26 stator coil windings; concurrently, parallel capacitor C51 and resistor R53 maintain a voltage V3 while the value of angle command $\phi$ is greater than the set threshold angle $\theta$.

During subsequent operation, when it is initially determined by the compare and hold circuit 20 that the voltage drop across the current sensing resistor R2 has a magnitude representative of the condition wherein the magnitude of the angle command $\phi$ has now decreased and is now equal to or less than the determined threshold angle $\theta$, then amplifier OP5 outputs a signal to amplifier OP6 having the magnitude which is a function of the output of the preamp 18. However, due to the discharge rate of the capacitor C51 thru parallel resistor R53 the magnitude of voltage V3, the output of the compare and hold circuit 20 and the input to select circuit 21, is maintained and the switching control circuit 23 is maintained in an activated state, keeping switch contacts SR31, SR32 and SR33 open, until such time that the output V3 of the compare and hold circuit 20 drops below reference voltage V2 at which point the switching control circuit 23 is deactivated and the drive signals X,Y, and Z are shunted around the current limiting resistors R31, R32 and R33 and pass unhindered to the synchro load 26.

Whereas it is contemplated that the system described above may be advantageously utilized when the reference voltages V1 and V2 are equal, the present inventors have found that particular benefit may be achieved when reference voltage V2 is less than reference voltage V1. During operation of the system with voltage V2 less than voltage V1, when the angle command $\phi$ becomes less than the threshold angle $\theta$, the input to amplifier OP6 is maintained for a further short time interval beyond occurrence of such a condition due to the discharge of the capacitor C51 thru resistor R53 which maintains an input voltage V3 to amplifier OP6 which is greater than voltage V2. Such a mode of operation is generally preferred as it provides that at the time that the switching control circuit 23 causes the signals X, Y, and Z currents to be limited by power limiting resistors R31, R32 and R33, the actual angle command $\phi$ will generally be expected to be less than the threshold angle value $\theta$. Thus the current limiting resistor R31, R32, R33 will not immediately be shunted by SR31, SR32 and SR33. The threshold angle value $\theta$ is the point at which the response of the synchro 26 load and display device is considered to be acceptable, although not necessarily optimal. It should be apparent therefore, that setting voltage V2 to be slightly less than voltage V1 would normally be expected to improve the response and operation, enhancing the accuracy and sensitivity of the overall system 10 response and prevent the current limiting resistors R31, R32 and R33 from being repeatedly switched in series in the power conductors to synchro 26.

During operation, if it is determined by the compare and hold circuit 20 that the voltage drop across the current sensing resistor R2 as amplified by the preamplifier 18 has a magnitude representative of the condition wherein the magnitude of the angle command $\phi$ is less than the determined threshold angle value $\theta$, then amplifier OP5 outputs a signal V3 having the magnitude which is a function of the signal received from the preamplifier 18; and concurrently, when the capacitor C51 has been discharged sufficiently then this lower magnitude voltage V3 is provided to amplifier OP6. When the voltage signal V3 received is less than the reference voltage V2, amplifier OP6 in turn activates the switching circuit 23 closing contacts SR31, SR32, SR33 and causing the power limiting resistors R31, R32 and R33 to be shunted and removed from the series path for drive signals X, Y, and Z which are subsequently provided to the synchro 26 stator coil windings.

The system as described above may further optionally but most preferably, be provided with a pulse width oscillator 24 as shown on FIG. 2. Pulse width oscillator 24 may be a circuit substantially as shown in FIG. 2 and includes a pulse width oscillator IC PWO9 and a signal isolation diode D91. Such pulse width oscillator 24 operates to provide periodic higher power pulses, having the same magnitude as the magnitude of the current commanded drive signal X, Y, and Z which are provided in response to the angle command input $\phi$. The pulse width oscillator operates when the angle command input $\phi$ exceeds the threshold angle value $\theta$ of the system 10 to apply intermittent high power pulses to the synchro 26 stator windings. In this manner the maximum power which is applied in an intermittent fashion provides the proper drive to the synchro 26. This feature is particularly beneficial when the synchro drive system must operate under adverse environmental conditions, such as temperature, friction and other effects.

The period of the intermittent pulses which our system causes to be applied to synchro 26 is also understood to be a variable which is a function of the particular characteristics of the system within which our invention is to be implemented. Generally, one must assure that the amount of current per unit of time is not so great as to cause undesirable instabilities or oscillatory response in the response of the servo drive system. At the same time, it must be understood that sufficient current per unit time be output to the synchro drive system so to assure that the response of the servo drive system is not too sluggish or too insensitive to a change in the angle command $\phi$. Such would result in sluggish, or inaccurate readings provided by the system. To avoid such shortcomings and assure that sufficient power is output to the synchro drive system, one may vary the length of the pulse, or the period of the pulses per unit time, or both.

Figure 3:
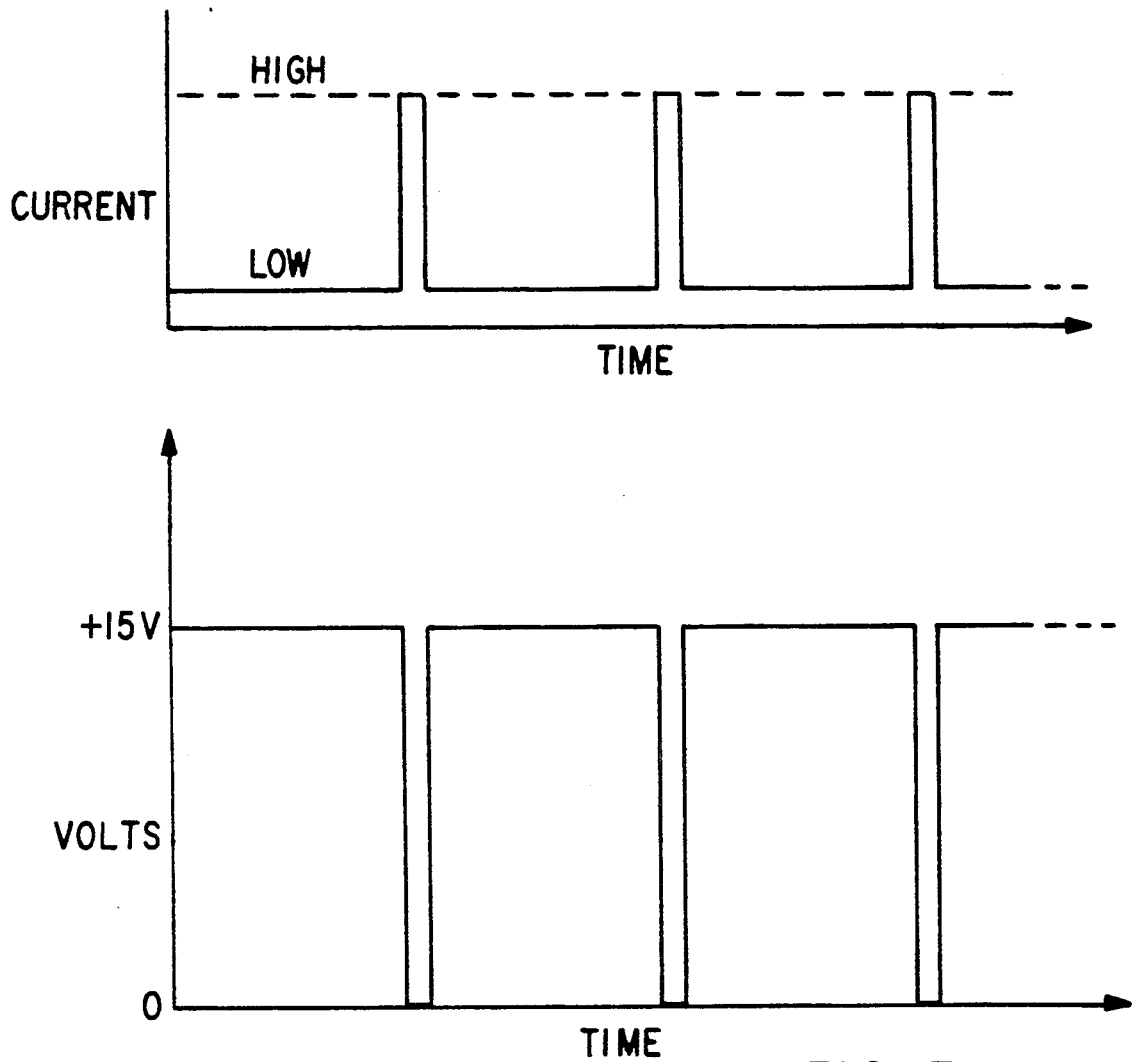

By way of illustration, a representation of the output of pulse width oscillator which is provided for controlling operation by our system 10 when in the current limiting mode of operation is shown on FIG. 3. When the system 10 is in the current limiting mode with SD7 activated and switches SR31, SR32 and SR33 open the pulse width oscillator 24 is connected to periodically turn off SD7 closing switches SR31, SR32 and SR33 to allow full AC drive current, as shown in FIG. 3, to be periodically applied to the stator windings of synchro 26.

The output of pulse width controller 24 is connected to the base of transistor switch SD7. When the output of controller 24 is +15 volts, transistor SD7 is controlled by the output of amplifier OP6. However, when the output of pulse width controller falls to 0 volts transistor switch SD7 is turned off and switches SR31, SR32 and SR33 close to shunt out current limiting resistors R31, R32 and R33. When the output of controller increases to +15 volts transistor SD7 is again controlled by the output of amplifier OP6. Note when the angle command $\phi$ is small circuit 10 is not in the current limiting mode, transistor switch SD7 is off, switches SR31, SR32, SR33 are closed and the output of pulse width control 24 has no effect on the synchro 26 operation.

It is to be understood that the threshold angle value $\theta$ is a characteristic of the particular system within which our invention is implemented. In the present system the angle command $\phi$ was evaluated. At such an angle command $\phi$ the oscillation in the response of the servo drive was considered to be optimum; however, it is to be understood that with a different synchro load configurations a different value of $\theta$ would have to be chosen.

We claim:

1. A stabilization system for a synchro which is driven by drive current outputs from a digital signal to synchro signal converter comprising:

a current sensor disposed between the synchro and the digital signal to synchro signal converter for sensing the magnitude of the drive current which drives the synchro;

a current limiter disposed between the synchro and the digital signal to synchro signal converter which is operable in a non-current limiting mode permitting the sensed drive current to pass unhindered to the synchro, and a current limiting mode, limiting the sensed drive current provided to the synchro;

compare means for comparing the current signal sensed by said current sensor with a reference current signal and providing a current limiting command signal for initiating switching of said current limiter to the current limiting mode when the sensed current signal exceeds the reference current signal;

switch control means connected to said compare means to receive the current limiting command signal from said compare means for controlling said current limiter to cause said current limiter to switch to a current limiting mode when the sensed current signal exceeds the reference current signal; and, wherein said compare means includes a hold circuit for providing a signal to keep said current limiter in the current limiting mode for a period of time after the sensed current signal falls below the reference current signal which provides for more stable operation of the synchro by inhibiting said current limiter from repeatedly switching between the current limiting mode and the non-current limiting mode.

2. A system as claimed in claim 1, further comprising pulse width oscillator means for providing a signal to said switch control means which overrides the current limiting command signal from said compare means, for periodic short periods of time, causing said current limiter to periodically allow high current pulses to pass unhindered to the synchro.

3. A method for stabilizing a synchro which is driven by drive current from a digital to synchro converter comprising the steps of:

a. disposing a current limiter, which is switchable between a current limiting mode and a non-current limiting mode, between the synchro and the digital to synchro converter;

b. sensing the drive current being fed to said synchro;

c. comparing the sensed synchro drive current with a predetermined referenced level;

d. switching said current limiter to the current limiting mode when the sensed synchro drive current is greater than the predetermined reference level; and e. periodically switching said current limiter to the non-current limiting mode to periodically supply high current pulses to the synchro during times when the sensed synchro drive current exceeds the predetermined reference level.

4. A method as claimed in claim 3, comprising the further step of:

f. maintaining said current limiter in the current limiting mode for a short period of time after the sensed synchro drive current falls beneath the predetermined reference level.

5. A synchro system comprising:

a synchro movable to a position in response to AC current signals;

a digital to synchro converter which receives a digital angle command and provides AC current signals for causing said synchro to move to a position;

a current sensor, disposed between said synchro and said digital to synchro converter, which provides a signal indicative of the AC current signals;

compare means connected to said current sensor for comparing the signal indicative of the AC current signals with a reference signal and providing an output when the reference signal is exceeded;

logic means connected to said compare means for providing a control signal in response to the output from said compare means;

a current limiter disposed between said synchro and said digital to synchro converter operable in a current limiting mode wherein current limiting means are disposed between said synchro and said digital to synchro converter for limiting the AC current signals to said synchro and a non-current limiting mode wherein said current limiting means are not utilized and being switchable between said current limiting mode and said non-current limiting mode in response to the control signal from said logic means; and pulse width oscillator means connected to said logic means for providing an override signal to said logic means for overriding the signal from said compare means causing said logic means to periodically cause said current limiter to switch to the non-current limiting mode and not limit the AC current signals to said synchro.

6. A synchro system as claimed in claim 5 including hold means for keeping said current limiter in the current limiting mode for a period of time after the signal from said current sensor becomes less than the reference signal.

* * * * *